(12) United States Patent
Borovoy et al.

(10) Patent No.: US 9,537,865 B1
(45) Date of Patent: Jan. 3, 2017

(54) ACCESS CONTROL USING TOKENS AND BLACK LISTS

(71) Applicant: International Business Machines Corporation, Armonk, NY (US)

(72) Inventors: Ishai Borovoy, Petach Tiqwa (IL); Iddo Levin, Tel Aviv (IL); Haim Schneider, Ramot Meir (IL); Artem Spector, Rishon Le-Zion (IL); Tomer Vilensky, Tel Aviv (IL); Uri Zonens, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/957,668

(22) Filed: Dec. 3, 2015

(51) Int. Cl.
*G06F 21/00* (2013.01)
*H04L 29/06* (2006.01)

(52) U.S. Cl.
CPC ............... *H04L 63/10* (2013.01); *H04L 63/08* (2013.01)

(58) Field of Classification Search
CPC .................................................. H04L 63/083
See application file for complete search history.

(56) References Cited

U.S. PATENT DOCUMENTS

| | | | |
|---|---|---|---|
| 8,042,163 B1* | 10/2011 | Karr | G06F 3/062 713/164 |
| 8,266,684 B2 | 9/2012 | Kline et al. | |
| 8,392,702 B2 | 3/2013 | Qiu et al. | |
| 8,973,118 B2 | 3/2015 | Fitzpatrick, III | |
| 2009/0031131 A1* | 1/2009 | Qiu | H04L 63/0442 713/172 |
| 2012/0304311 A1* | 11/2012 | Kline | G06F 21/33 726/28 |
| 2012/0324233 A1* | 12/2012 | Nguyen | H04L 9/0866 713/179 |
| 2013/0086645 A1* | 4/2013 | Srinivasan | H04L 63/10 726/4 |

(Continued)

FOREIGN PATENT DOCUMENTS

WO 2013049461 A2 4/2013

OTHER PUBLICATIONS

"Access token revocation implementation in OAuth 2", http://www.codegithub.com/watch?v=0SSyzUgQexgq, Printed on Oct. 20, 2015, 3 pages.

(Continued)

*Primary Examiner* — Morshed Mehedi
(74) *Attorney, Agent, or Firm* — Kristofer L. Haggerty

(57) ABSTRACT

Examples of techniques for validating access tokens are described herein. An example computer-implemented method includes receiving, via a processor, a pushed event at a server. The method includes adding, via the processor, a value of the pushed event to a black list of recently disabled users, devices, applications, or any combination thereof. The method also includes receiving, via the processor, a request to access a resource on the server, the request including an access token. The method further includes comparing, via the processor, a field value of the access token with the black list. The method further includes declining, via the processor, the request based on a match of the field value of the access token with a value of the pushed event in the black list.

20 Claims, 6 Drawing Sheets

(56) References Cited

U.S. PATENT DOCUMENTS

| | | | | |
|---|---|---|---|---|
| 2013/0160099 A1* | 6/2013 | Fitzpatrick, III | ..... | H04L 9/3213 726/7 |
| 2014/0298016 A1* | 10/2014 | Ekberg | ................. | G06F 21/335 713/168 |
| 2014/0298420 A1* | 10/2014 | Barton | ................... | H04L 63/10 726/4 |
| 2015/0112870 A1* | 4/2015 | Nagasundaram | .. | G06Q 20/3821 705/67 |
| 2015/0319158 A1* | 11/2015 | Kumnick | ............. | H04L 63/083 726/9 |

OTHER PUBLICATIONS

Wikipedia, "Mobile application management", From Wikipedia, the free encyclopedia, https://en.wikipedia.org/wiki/Mobile_application_management, printed on Oct. 20, 2015, 3 pages.

Hardt, "The OAuth 2.0 Authorization Framework", http://tools.ietf.org/html/rfc6749, Microsoft, Oct. 2012, 76 pages.

* cited by examiner

ACCESS CONTROL USING TOKENS AND BLACK LISTS

BACKGROUND

The present invention relates generally to a method, system, and computer program product for controlling access to resources on a server, and more particularly to a method, system, and computer program product for controlling access to a resource server using access tokens.

SUMMARY

According to an embodiment described herein, a system can include a processor to receive a request from a client device for an access token. The processor can further build the access token including one or more security fields with values corresponding to the client device. The processor can also further send the access token to the client device. The processor can also further receive an event including a black listed value. The processor can also push the black listed value to a resource server.

According to another embodiment described herein, a method can include receiving, via a processor, a pushed event at a server. The method can also include adding, via the processor, a value of the pushed event to a black list of recently disabled users, devices, applications, or any combination thereof. The method can further include receiving, via the processor, a request to access a resource on the server, the request including an access token. The method can also further include comparing, via the processor, a field value of the access token with the black list. The method can also include declining, via the processor, the request based on a match of the field value of the access token with a value of the pushed event in the black list.

According to another embodiment described herein, a computer program product for access control can include computer-readable storage medium having program code embodied therewith. The computer readable storage medium is not a transitory signal per se. The program code executable by a processor to cause the processor to receive a pushed event. The program code can also cause the processor to add a value from the pushed event to a black list of recently disabled users, devices, applications, or any combination thereof. The program code can also cause the processor to receive a request to access a resource on the server, the request including an access token. The program code can also cause the processor to further compare a field value of the access token with the black list. The program code can also cause the processor to also further decline the request based on a match of the field value with a value of the pushed event in the black list. The program code can also cause the processor to determine an expiration time of the access token associated with the pushed event. The program code can also cause the processor to also further remove the pushed event from the black list at a predetermined time greater than the expiration time of the access token associated with the pushed event.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
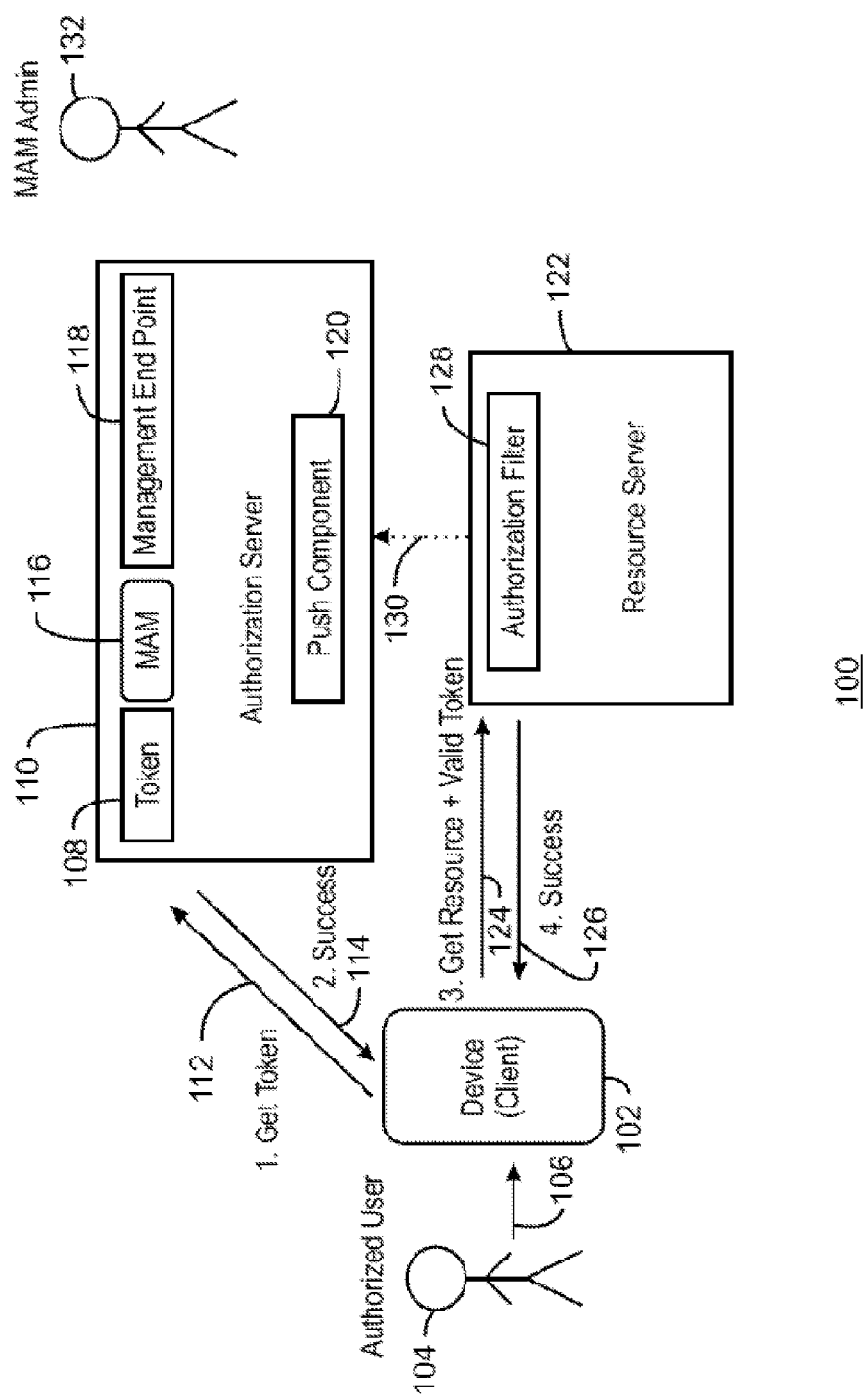
FIG. 1 is a block diagram of an example system for controlling access to a resource server using access tokens and black lists, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Applications in modern electronic devices, such as mobile devices, may have multiple objects to be authenticated for access control purposes. For example, objects to be authenticated for security purposes can include a mobile device, a mobile application and/or a user of the mobile application or client device. An authentication framework such as OAuth 2.0 can be integrated with a mobile application management functionality to control access to mobile applications using access tokens. An access token, as used herein, includes security fields that include information such as a device id, user id, application id, and device type, among other criteria that can be used to control access. Two methods of access token validation include online validation and offline validation. Online validation includes validating an access token at an authorization server each time that an application, user, or device accesses a resource. Online validation is thus inefficient as it produces network traffic, latency and thus poor overall performance. Online validation is particularly inefficient when the resources are on a resource server that is not on the same network as the authorization server. For example, the authorization server may be at a particular location while the resources may be located on a cloud-based server at a different location. Offline validation refers to the local validation of an access token at a resource server using additional information included within the access token. For example, the additional information can include a client ID, granted access scopes, and expiration times for the access token and/or the individual access scopes. The access token may also be signed by an authorization server for offline validation purposes. However, offline validation has limited functionality as granted access scopes are valid until their expiration times and cannot be revoked. Furthermore, using short expiration times creates inefficiency with unnecessary network traffic. Moreover, a change in access scope may still have a latency associated with the expiration time.

According to embodiments of the present disclosure, an authorization server can authenticate client devices and/or users and send access tokens including one or more security fields with values corresponding to the client devices. The access token can be used by the client device to gain access to resources on a resource server. The authorization server also includes a mobile application management module and a management end point that can receive an event including security field values to be black listed. The authorization server may be communicatively coupled to the resource server such that the authorization server can push the security field values to be black listed to the resource server. Thus, embodiments of the present disclosure allow an administrator to disable a device, application, or user in real time without the inefficiencies of online validation.

An embodiment is described in detail below by referring to the accompanying drawings in FIGS. 1 to 6. Those skilled in the art will readily appreciate that the detailed description given herein with respect to these figures is for explanatory purposes as the invention extends beyond these limited embodiments.

With reference now to FIG. 1, a block diagram shows an example system for controlling access to a resource server using access tokens and black lists, according to an exemplary embodiment. The example system is generally referred to by the reference number 100. FIG. 1 includes a client device 102 being used 106 by an authorized user 104. The client device 102 is shown requesting an access token 108 from an authorization server 110 and receiving the access token 108, as indicated respectively by arrows 112 and 114. The authorization server 110 further includes a mobile application management (MAM) module 116 and a management end point 118 and a push component 120. The client device 102 is also shown requesting a resource from resource server 122 and receiving a resource from the resource server 122, as indicated respectively by arrows 124 and 126. The resource server 122 includes authorization filter 128 that is communicatively coupled to the push component 120 of the authorization server 110 as shown by arrow 130.

In the example of FIG. 1, client device 102 receives input from authorized user 104 to access one or more resources on resource server 122. In an example, an application on the client device 102 may detect that an access token 108 is not on the device or is expired. The client device 102 may thus connect with authorization server and send an access token request 112 to the authorization server 110. In an example, the authorization server may authenticate the authorized user 104 and/or the client device 102. If the authentication is successful, the authorization server 110 can build an access token 108 including security fields with values corresponding to the client device 102 and/or authorized user 104. For example, the security fields can include user id, device id, application id, etc. The authorization server 110 may then send the access token 108 to the client device 102.

Still referring to FIG. 1, the client device 102 can send the access token 108 with a request 124 for a resource to the resource server 122. For example, the resource may be an application service and/or content. The resource server 122 can compare the values in the access token 108 with values of a black list located on the resource server 122. Since the user 104 is authorized, and the user id value is therefore not on the black list, and the client device id value is also not on the black list, the resource server may provide access 126 to the client device 102.

In some embodiments, the resource server 122 may include an authorization filter 128 that can establish an open socket connection 130 with a push component 120 of the authorization server 110. Thus, when a MAM administrator 132 provides a value to be black listed at the management end point 118, the authorization server 110 can immediately push the value to the resource server 122 via the push component 120. The resource server 122 can add the value to the black list.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc).

Figure 2:
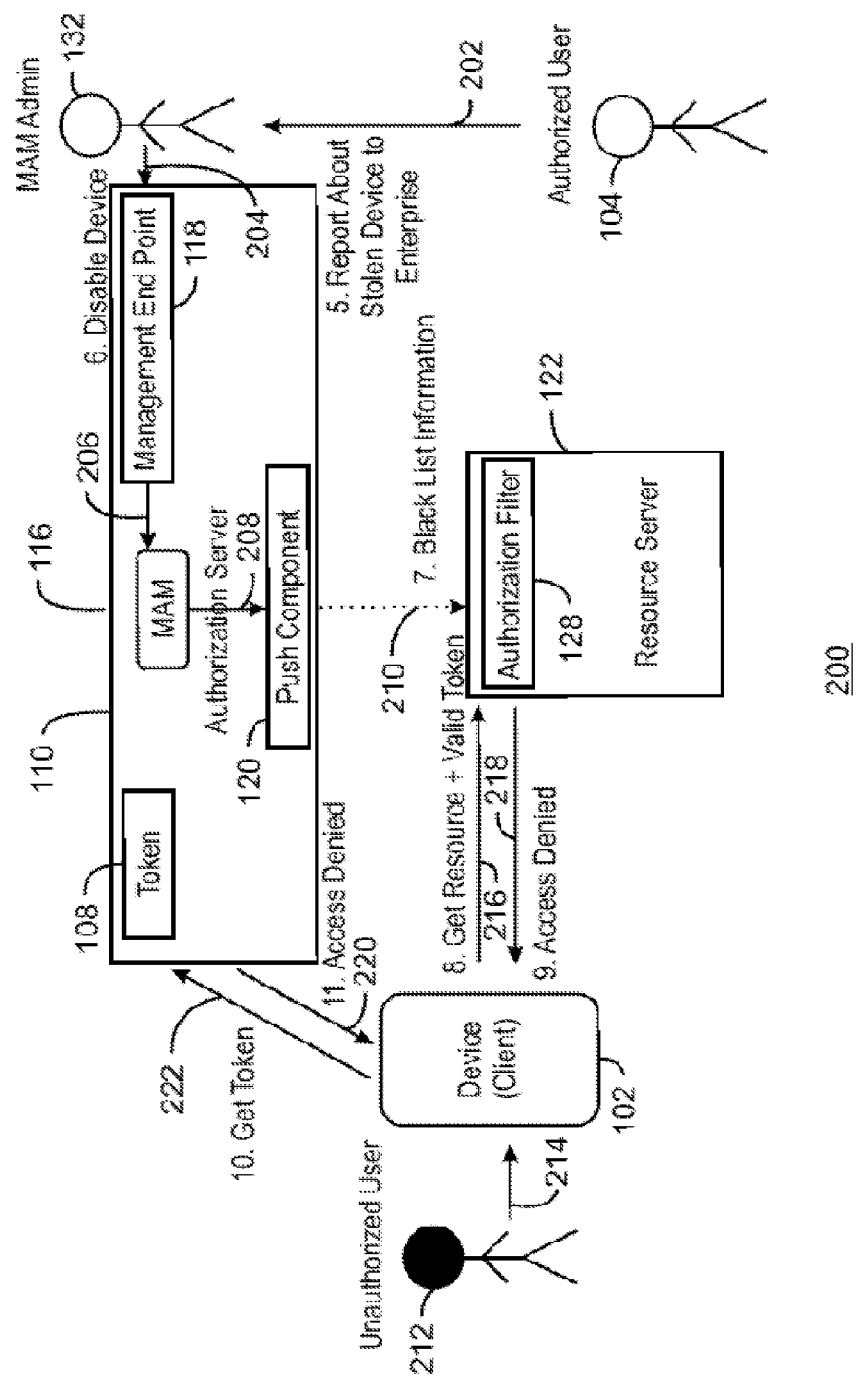
FIG. 2 is a block diagram of an example system for denying access to a black listed device, in accordance with an embodiment of the present invention.

With reference now to FIG. 2, a block diagram shows an example system for denying access to a black listed device. The example system is generally referred to by the reference number 200. FIG. 2 shows the authorized user 104 reporting 202 a stolen device to the MAM administrator 132. The MAM administrator is shown inputting 204 the device id value into management endpoint 118 of the authorization server 110. The management end point 118 is shown sending 206 the device id value to the MAM 116, which in turns sends 208 the device id value to the push component 120. The push component 120 is shown pushing 210 the device id value to the authorization filter 128 of the resource server 122. FIG. 2 also includes an unauthorized user 212 that is shown sending 214 a request via client device 102 to resource server 122. The client device 102 is shown sending 216 the resource request with an unexpired, valid token to the resource server 122. The resource server 122 is shown denying access 218 to the client device 102. The client device 102 is also shown requesting 222 an access token 108 from the authorization server 110. The authorization server 110 is shown denying 220 the access token 108 to the client device 102.

In the example of FIG. 2, an unauthorized user 212 has stolen the client device 102 from the authorized user 104 and is attempting to access resources on the resource server 122. However, the authorized user 104 has reported 202 the stolen device to the MAM administrator 132. The MAM administrator has therefore inputted the device id value into the management end point 118 of the authorization server 110. The authorization server 110 also instantly pushed the device id value via the push component 120 to the authorization filter 128 of resource server 122. The resource server 122 has thus added the device id value to a black list located on the resource server 122.

Still referring to FIG. 2, when the resource server 122 receives the request 216 for access to resources with a valid token, the resource server 122 may compare the values of various security fields in the token against values in the black list. Since the value of the device id in the device id security field of the token is present in the black list, the resource server 122 returns a message 218 denying access to the client device 102. In some examples, the message 218 may also invalidate the token such that the token is no longer a valid token. The client device 102 may then attempt to obtain a new access token 108 from the authorization server 110. However, because the authorization server 110 also contains a copy of the black list, the authentication of the client device 102 will fail and the access token 108 will be denied to the client device 102. Thus, the unauthorized user is effectively prevented from accessing resources of the resource server using the stolen client device 102. In some examples, the MAM administrator 132 can remove the device id from the black list. The authorization server 110 may push an update to remove the device id from the black list. For example, the client device 102 may have been lost and returned to the authorized user 104. In an examples, the client device 102 may then obtain a new access token 108 from the authorization server 110 as described in detailed with reference to FIG. 1. In some examples, where the original access token 108 is not invalidated by the resource server, the original access token 108 may again be used to access resources from the resource server 122.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional client devices 102, or additional resource servers, etc.).

Figure 3:
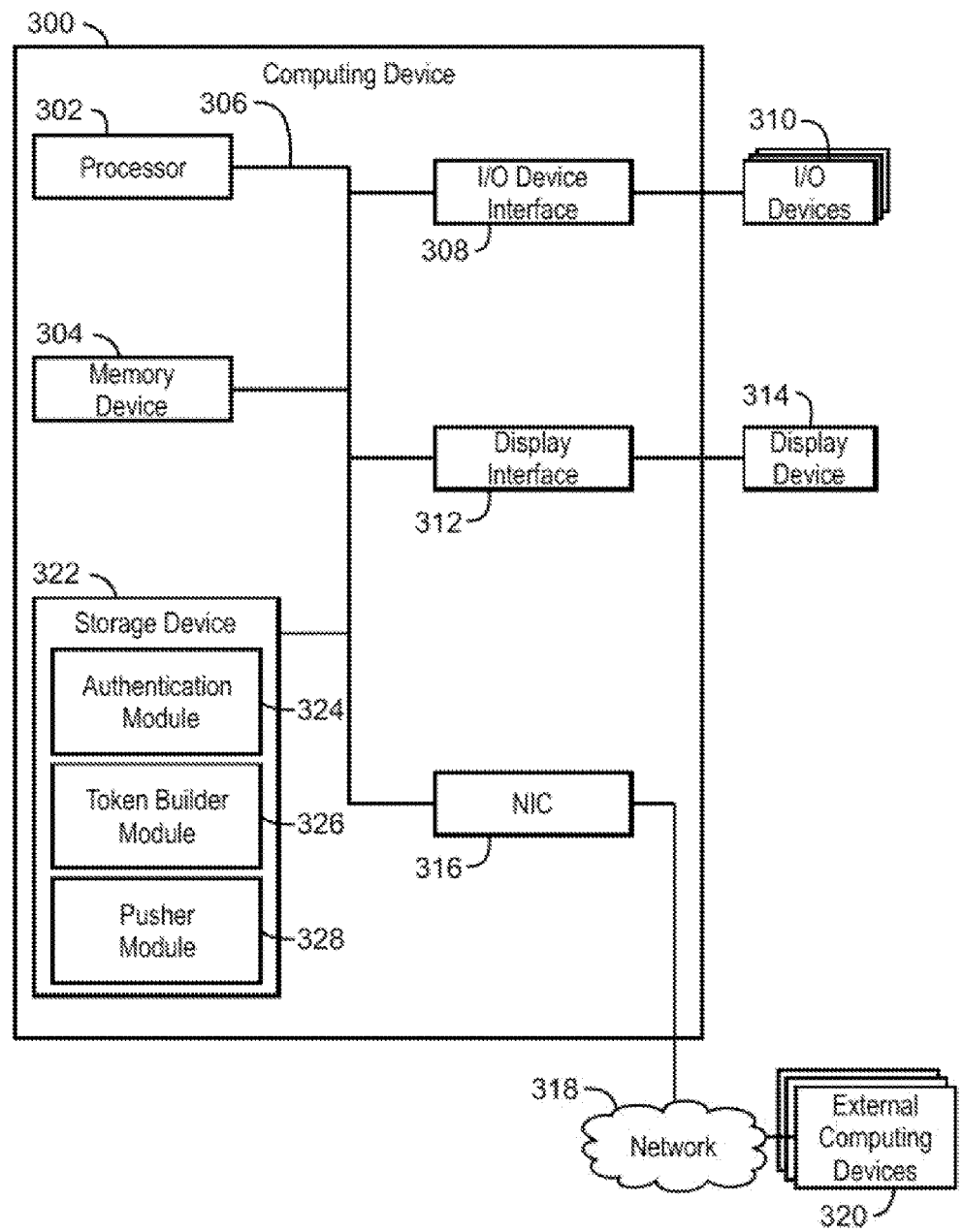
FIG. 3 is a block diagram of a computing device that can validate access tokens, in accordance with an embodiment of the present invention.

FIG. 3 is block diagram of an example computing device that can authenticate client devices 102 and/or users. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory device 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. External computing devices 320 may connect to the computing device 300 through the network 318. In some examples, external computing devices 320 may include an external webserver such as the resource server 122 of FIGS. 1 and 2 above. For example, the external webserver may host a service to be accessed by a mobile application on a client device. In some examples, external computing devices 320 may include one or more cloud computing nodes. In some examples, external computing devices 320 can include a resource server and a client device.

The processor 302 may also be linked through the system interconnect 306 to a storage device 322 that can include a hard drive, an optical drive, a USB flash drive, an array of drives, or any combinations thereof. In some examples, the storage device may include an authentication module 324, a token builder module 326, and a pusher module 328. The authentication module 324 can receive a request from a client device for an access token 108. The authentication module 324 can authenticate the user and the client device. For example, the authentication module 324 can authenticate the user and/or client device via an authorization framework such as OAuth 2.0. The authentication module 324 can deny the access token 108 to the client device if the processor fails to authenticate the user or the client device. The token builder module 326 can build the access token 108 including one or more security fields with values corresponding to the client device. In some examples, the access token 108 can further include an expiration time. In some examples, the one or more security fields can include a user id, a device, id, an application id, and/or a device type, among other attributes that may be used to control access. The authentication module 324 may then send the access token 108 to the client device. The pusher module 328 can receive an event including a black listed value. In some examples, the event can include a mobile application management event including one or more black list values corresponding to one or more of the security fields. The pusher module 328 can push the black listed value to a resource server. For example, the pusher module 328 can push the black listed value via long polling or message-oriented middleware.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the authentication module 324, the token builder module 326, and the pusher module 328 may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the authentication module 324, the token builder module 326, and the pusher module 328 can be implemented with logic, wherein the logic, as referred to herein, can include any suitable hardware (e.g., a processor, among others), software (e.g., an application, among others), firmware, or any suitable combination of hardware, software, and firmware.

Figure 4:
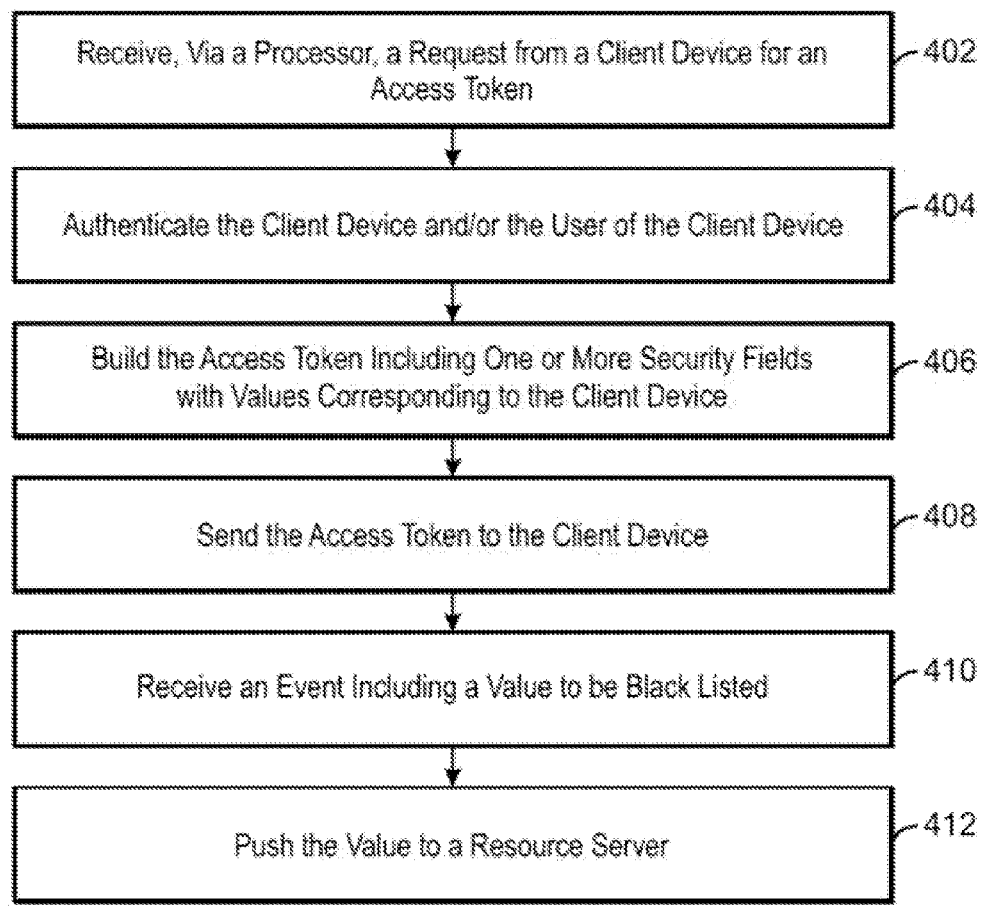
FIG. 4 is a process flow diagram of a method that can control access to resources using a black list, in accordance with an embodiment of the present invention.

FIG. 4 is a process flow diagram of an example method that can control access to resources using a black list. The method 400 can be implemented with any suitable computing device, such as the computing device 300 of FIG. 3 and is described with reference to the systems 100 and 200 of FIGS. 1 and 2, respectively. For example, the methods described below can be implemented by the authorization server 110 of FIGS. 1 and 2.

At block 402, the authorization server 110 can receive, via a processor, a request from a client device for an access token 108. For example, the client device may be a mobile device. The access token 108 may be used by the client device to access resources from a resource server as described with reference to FIG. 5 below.

At block 404, the authorization server 110 can authenticate the client device and/or the user of the client device. For example, the authorization server 110 can authenticate the client device and/or user using an open source authorization framework such as OAuth 2.0, among others.

At block 406, the authorization server 110 can build the access token 108 including one or more security fields with values corresponding to the client device. For example, the security fields can include a user id, a device id, an application id, and/or a device type, among others. In some examples, the authorization server 110 may also include an expiration time in the access token 108.

At block 408, the authorization server 110 can send the access token 108 to the client device. For example, the authorization server 110 may send the access token 108 to the client device using any suitable network connection.

At block 410, the authorization server 110 can receive an event including a value to be black listed. For example, the event can include one or more security field values to be black listed. The values may correspond to security fields of device id, user id, application id, device type, among others. In some embodiments, the security field values to be black listed can correspond to any event in which unauthorized access of a resource is requested. For example, an attempt to request a resource by an unauthorized user, device or application, among others can result in the unauthorized user, device, or application being added to the black list. In some embodiments, the security field values to be black listed can correspond to any event in which access to a resource is modified. For example, the event may correspond to any mobile application management action. In some examples, a user may no longer be authorized to access a resource due to a change in employment. In some examples, the user may have attempted to login to an authorization server several times without success. The user may be added to the black list for a predetermined amount of time. In some examples, a device may be added to the black list. For example, a device may no longer be authorized to access a resource due to a known vulnerability affecting the device. The device may be added to the black list until the vulnerability is fixed. In some examples, the device may have been lost, stolen, expired, or disabled. The device may be added to the black list until any Likewise, an application may be added to the black list. For example, the application may have a known vulnerability. The application may also be added to the black list until the known vulnerability is fixed. In some examples, an application may be added to the black list due to some illegality.

At block 412, the authorization server 110 can push the black listed value to a resource server. For example, the authorization server 110 can establish an open socket connection with the resource server. The authorization server 110 can then push the value to the resource server immediately upon receiving the value from a management end point as described in greater detail with reference to FIG. 2 above. In some examples, the authorization server 110 can use long polling to push values to the resource server. In some examples, the authorization server 110 can use long polling or message-oriented middleware to push the values to the resource server.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
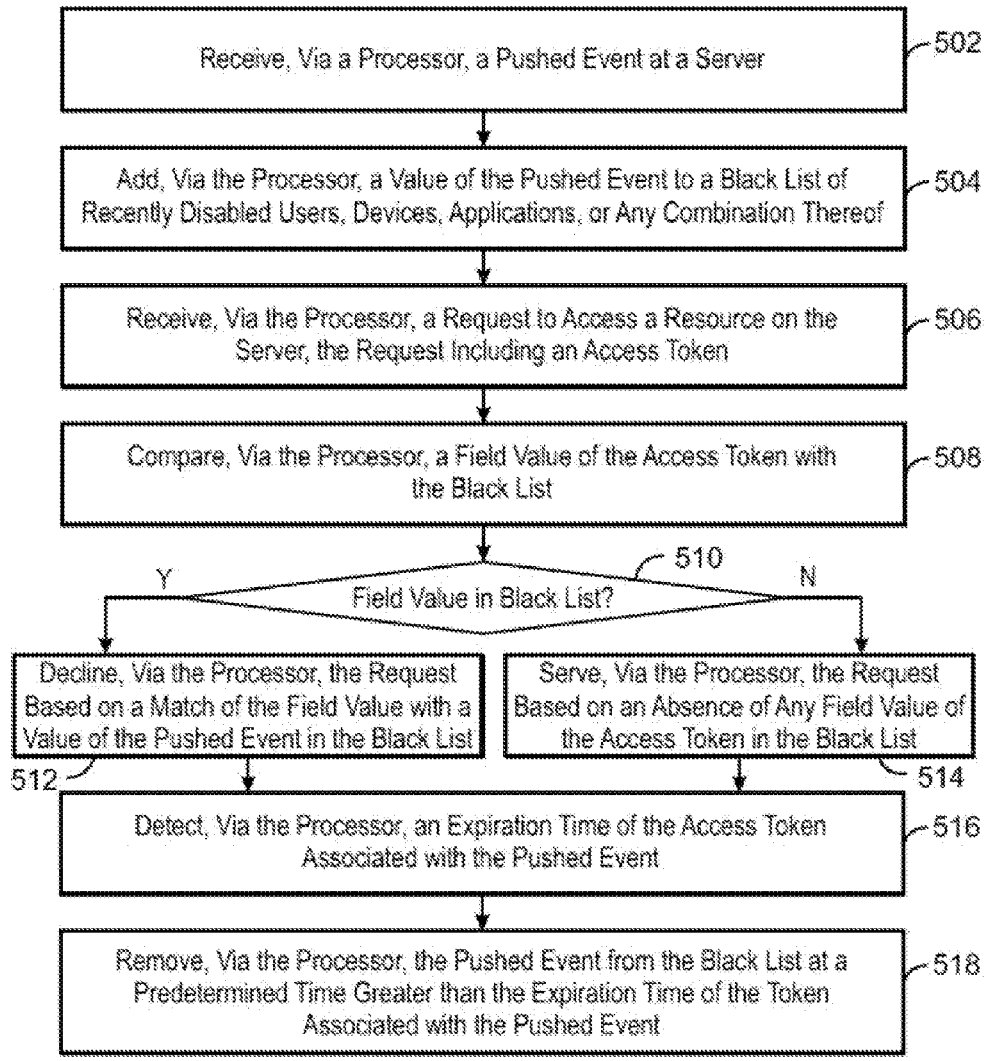
FIG. 5 is a process flow diagram of a method that can control access to resources using a black list, in accordance with an embodiment of the present invention.

FIG. 5 is a process flow diagram of another example method that can control access to resources using a black list. The method 500 can be implemented with any suitable computing device and is described with reference to the systems 100 and 200 of FIGS. 1 and 2. For example, the methods described below can be implemented by the resource server 122 of FIGS. 1 and 2.

At block 502, the resource server can receive, via a processor, a pushed event. For example, the pushed event can include one or more security field values to be black listed. The resource server may receive the pushed event via an open socket. For example, the pushed event may be received using long polling or by receiving a message via message oriented middleware.

At block 504, the resource server can add, via the processor, the pushed event to a black list of recently disabled users, devices, applications, or any combination thereof. For example, the black list may contain user ids, device ids, application ids, and device type ids, among other security field values that may be used to black list users, devices, or applications.

At block 506, the resource server can receive, via the processor, a request to access a resource on the server, the request including an access token 108. For example, the access token 108 may include a device id, user id, application id, among other security field values, and an expiration time.

At block 508, the resource server can compare, via the processor, a field value of the access token 108 with the black list. For example, the security field values corresponding to the security fields of device id, user id, or application id may be compared to values in the black list.

At block 510, the resource server can determine whether a field value is present in the black list. If the field value of the access token 108 is in the black list, then the method may proceed at block 512. If the field value of the access token 108 is not present in the black list, then the method may proceed at block 514.

At block 512, the resource server can decline, via the processor, the request based on a match of the field value with a value of the pushed event in the black list. For example, a particular value of a device id in an access token 108 may be in the black list. The device associated with the device id will therefore be unable to access the resources until the device id is removed from the black list. In some examples, user ids and application ids may also be black listed. For example, a particular user may be denied access to the resources regardless of the device used. In the same manner, an application may be denied access to particular resources. For example, an application may contain recently discovered security flaws and therefore be black listed. The method may proceed at block 516.

At block 514, the resource server can serve, via the processor, the request based on an absence of any field value of the access token 108 in the black list. For example, a client device submitting a valid access token 108 may thus access resources on the resource server. The method may proceed at block 516.

At block 516, the resource server can detect, via the processor, an expiration time of the access token 108 associated with the pushed event. For example, the expiration time of the access token 108 may be set for a duration such that network usage and authorization server 110 usage is reduced.

At block 518, the resource server can remove, via the processor, the pushed event from the black list at a predetermined time greater than the expiration time of the token associated with the pushed event. For example, since a token may remain valid until an associated expiration time, the black list values may be retained on the resource server until the expiration time of the associated access token 108. In some examples, the black list time may be longer to prevent new access tokens 108 from being issued by the authorization server 110 and used by black listed users, devices, or applications.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
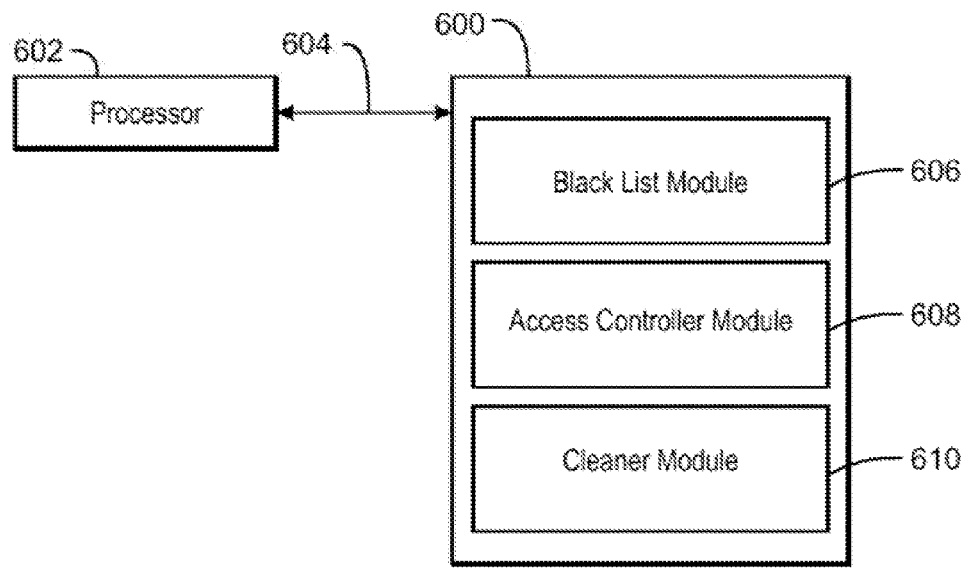
FIG. 6 is an example tangible, non-transitory computer-readable medium that can validate access tokens offline using black lists, in accordance with an embodiment of the present invention.

Referring now to FIG. 6, a block diagram is depicted of an example tangible, non-transitory computer-readable medium 600 that can validate access tokens 108 offline using black lists. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 500 of FIG. 5 above.

The various software components discussed herein may be stored on the tangible, non-transitory, computer-readable medium 600, as indicated in FIG. 6. For example, a black list module 606 includes code receive a pushed event. The black list module 606 also includes code to add a value from the pushed event to a black list of recently disabled users, devices, applications, or any combination thereof. In some examples, the black list module 606 includes code to establish an open socket connection with an authorization server. In some examples, the black list module 606 includes code to performing a long polling. In some examples, the black list module 606 includes code to receive events via message-oriented middleware. An access control module 608 includes code to receive a request to access a resource on the server, the request including an access token 108. The access control module 608 further includes code to compare a field value of the access token 108 with the black list. The access control module 608 also includes code to decline the request based on a match of the field value with a value of the pushed event in the black list. In some examples, the access control module 608 can include code to serve the request to access the resource on the server based on an absence of any field value of the access token 108 in the black list. In some examples, the access control module 608 can include code to invalidate the access token 108 based on the match of the field value with the value of the pushed event in the black list. A cleaner module 610 includes code to determine an expiration time of the access token 108 associated with the pushed event. The cleaner module 610 also includes code to remove the pushed event from the black list at a predetermined time greater than the expiration time of the access token 108 associated with the pushed event. It is to be understood that any number of additional software components not shown in FIG. 6 may be included within the tangible, non-transitory, computer-readable medium 600, depending on the particular application.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for access control, comprising:
   determining whether an event has occurred, wherein the event is at least one of receiving an unauthorized request to access a resource, modification to the resource, exceeding a specified number of failed attempts to access the resource, a change in employment of a user attempting to access the resource, known illegality of the resource, and known vulnerability of the resource;
   based on determining that the event has occurred, pushing the event to a server;
   receiving the pushed event;
   adding a value of the pushed event to a black list of recently disabled users, devices, applications, or any combination thereof;
   receiving a request to access the resource on the server, the request comprising an access token;
   comparing a field value of the access token with the black list; and
   declining the request based on a match of the field value of the access token with a value of the pushed event in the black list.

2. The method of claim 1, further comprising:
   detecting an expiration time of a token associated with the pushed event; and
   removing the pushed event from the black list at a predetermined time greater than the expiration time of the token associated with the pushed event.

3. The method of claim 1, further comprising serving the request based on an absence of any field value of the access token in the black list.

4. The method of claim 1, wherein receiving the pushed event comprises performing a long polling.

5. The method of claim 1, wherein receiving the pushed event comprises receiving a message via message-oriented middleware.

6. The method of claim 1, wherein receiving the pushed event comprises receiving a value of the pushed event via an open socket.

7. The method of claim 1, further comprising invalidating the access token based on the match of the field value of the access token with the value of the pushed event in the black list.

8. A computer program product for access control, the computer program product comprising:
   one or more computer-readable storage media and program instructions stored on the one or more computer-readable storage media, the program instructions comprising:
   program instructions to determine whether an event has occurred, wherein the event is at least one of receiving an unauthorized request to access a resource, modification to the resource, exceeding a specified number of failed attempts to access the resource, a change in employment of a user attempting to access the resource, known illegality of the resource, and known vulnerability of the resource;
   based on determining that the event has occurred, program instructions to push the event to a server;
   program instructions to receive the pushed event;
   program instructions to add a value from the pushed event to a black list of recently disabled users, devices, applications, or any combination thereof;
   program instructions to receive a request to access the resource on the server, the request comprising an access token;
   program instructions to compare a field value of the access token with the black list; and
   program instructions to decline the request based on a match of the field value with a value of the pushed event in the black list.

9. The computer program product of claim 8, further comprising:
   program instructions to detect an expiration time of a token associated with the pushed event; and
   program instructions to remove the pushed event from the black list at a predetermined time greater than the expiration time of the token associated with the pushed event.

10. The computer program product of claim 8, further comprising program instructions to serve the request based on an absence of any field value of the access token in the black list.

11. The computer program product of claim 8, wherein the program instructions to receive the pushed event comprises program instructions to perform a long polling.

12. The computer program product of claim 8, wherein the program instructions to receive the pushed event comprises program instructions to receive a message via message-oriented middleware.

13. The computer program product of claim 8, wherein the program instructions to receive the pushed event comprises program instructions to receive a value of the pushed event via an open socket.

14. The computer program product of claim 8, further comprising program instructions to invalidate the access token based on the match of the field value of the access token with the value of the pushed event in the black list.

15. A computer system for access control, the computer system comprising:
   one or more computer processors, one or more computer-readable storage media, and program instructions stored on the one or more computer-readable storage media for execution by at least one of the one or more processors, the program instructions comprising:
   program instructions to determine whether an event has occurred, wherein the event is at least one of receiving an unauthorized request to access a resource, modification to the resource, exceeding a specified number of failed attempts to access the resource, a change in employment of a user attempting to access the resource, known illegality of the resource, and known vulnerability of the resource;
   based on determining that the event has occurred, program instructions to push the event to a server;
   program instructions to receive the pushed event;
   program instructions to add a value from the pushed event to a black list of recently disabled users, devices, applications, or any combination thereof;
   program instructions to receive a request to access the resource on the server, the request comprising an access token;
   program instructions to compare a field value of the access token with the black list; and program instructions to decline the request based on a match of the field value with a value of the pushed event in the black list.

16. The computer system of claim 15, further comprising:
program instructions to detect an expiration time of a token associated with the pushed event; and
program instructions to remove the pushed event from the black list at a predetermined time greater than the expiration time of the token associated with the pushed event.

17. The computer system of claim 15, further comprising program instructions to serve the request based on an absence of any field value of the access token in the black list.

18. The computer system of claim 15, wherein the program instructions to receive the pushed event comprises program instructions to perform a long polling.

19. The computer system of claim 15, wherein the program instructions to receive the pushed event comprises program instructions to receive a message via message-oriented middleware.

20. The computer system of claim 15, wherein the program instructions to receive the pushed event comprises program instructions to receive a value of the pushed event via an open socket.

* * * * *